Feb. 24, 1970 R. V. STOLFER 3,496,809
LATHE CHUCK SUPPORT
Filed Aug. 7, 1968 2 Sheets-Sheet 1

INVENTOR
Rudolph V. Stolfer

Feb. 24, 1970   R. V. STOLFER   3,496,809
LATHE CHUCK SUPPORT

Filed Aug. 7, 1968   2 Sheets-Sheet 2

INVENTOR
Rudolph V. Stolfer his attorneys

United States Patent Office 3,496,809
Patented Feb. 24, 1970

3,496,809
LATHE CHUCK SUPPORT
Rudolph V. Stolfer, R.D. 4, Box 85A,
Washington, Pa. 15301
Filed Aug. 7, 1968, Ser. No. 750,901
Int. Cl. B23b 3/36
U.S. Cl. 82—34                    3 Claims

ABSTRACT OF THE DISCLOSURE

A lathe chuck support including a base which spans the ways of a lathe, an upright support fixed on the base, a bar fixed to the upright support, a sleeve slidably and rotatably mounted on the bar, and stops on the bar for defining the limits of longitudinal movement of the sleeve with respect to the bar. A lathe chuck can be fixed on the sleeve for mounting or dismounting onto a lathe spindle.

---

This invention relates to an improved lathe chuck support for supporting a chuck during mounting or dismounting from a lathe spindle and during storage of the chuck when not in use.

Lathe chuck supports are desirable for use in mounting or dismounting chucks from a lathe, mainly because of the difficulty in placing or removing the cumbersome chuck on or from the lathe spindle. In handling a chuck without the benefit of a chuck support a danger always exists in dropping the chuck with consequent body or equipment damage resulting. Furthermore, it is difficult when mounting an unsupported chuck, to properly align the chuck with the lathe spindle. As a result, the threads on the chuck or spindle may be stripped or cross-threaded. Lathe chuck supports have been created to overcome the drawbacks inherent in handling an unsupported chuck. One group of such supports is somewhat complicated in that they require many shiftable and pivotable elements. Additionally, the use of these complicated supports is limited to one lathe since they necessarily must be permanently mounted on the lathe assembly. Portable type chuck supports have also been used, but also have their limitations. For one, the portable supports are only capable of being used with a one model lathe since they are made to fit on the ways of that lathe and since the way spacing and way shapes vary between different models of lathes, such portable supports cannot be used with any other lathes. These portable supports also fail to provide suitable means for aligning the chuck with the lathe spindle and, thus, the problem of cross-threading of the chuck with the spindle remains. Furthermore, the portable supports do not provide sufficient protection against dropping the chuck while mounted thereon especially during aligning the chuck with the lathe spindle.

My lathe chuck support is a portable one and overcomes the drawbacks noted above with regard to the existing portable supports, as well as providing other advantages such as simplicity of construction and stability in its use. Preferably, the lathe chuck support of my invention includes an elongated generally flat base member having a longitudinal length sufficient to span the ways of a lathe; upright support means fixed on the base member; an elongated bar member extending generally transversely of the base member and attached to the support means, with the inner end section of the bar being sized to fit into a lathe spindle opening; a sleeve member slidably and rotatably mounted on the bar member and sized to fit in a chuck bore; and stops on the bar member spaced to define the longitudinal limits of movement of the sleeve with respect to the bar.

Other details, objects and advantages of the invention will become apparent as the following description of certain present preferred embodiments thereof proceeds.

In the accompanying drawings I have shown certain present preferred embodiments of the invention in which.

Figure 1:
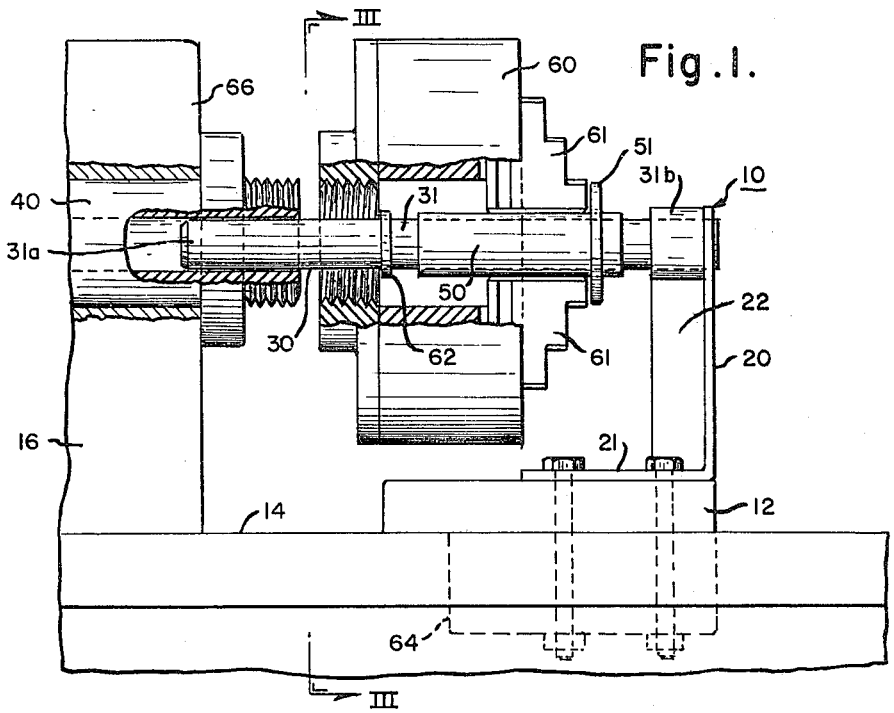
FIGURE 1 is a side elevational view of a lathe chuck support of my invention showing the support on the ways of a lathe with a chuck on the support in anticipation of mounting the chuck on the lathe spindle.

Referring now to the drawings wherein like reference numerals refer to like parts throughout the various views, 10 generally relates to a lathe chuck support embodying the present invention. Chuck support 10 includes an elongated base member 12 generally rectangular in shape and having a longitudinal length sufficient to span the ways 14 of a lathe 16. Since the spacing of ways of different model lathes of the same size vary, it is preferable to make the longitudinal length of base member 12 of a size sufficient to span the ways of the model lathe having the greatest way spacing. It should, however, be understood that the present invention can be adapted to be used with lathes having different swing sizes. The material selected for base member 12 should be of such a nature as to avoid any damage of the ways 14 by the base member 12. For example, a suitable wood could be used for making the base member 12.

An upright support member 20 extends from the upper surface of base member 12 and includes an elongated flat base plate 21 suitably secured to base member 12 with the longitudinal axis of base plate 21 generally parallel to the transverse axis of base member 12. A vertical leg in the form of an angle member 22 extends upwardly from the rear end of base plate 21. A generally cylindrically shaped elongated bar member 30 is suitably fixed, as by welding for example, at one end to the upper portions of the angle member 22. The longitudinal axis of bar member 30 is generally parallel to the transverse axis of base member 12. Bar member 30 includes a main body 31 having a diameter of a size such that the forward or inner end section 31a can fit into the opening of spindle 40 of lathe 16. The rearward or outer end section 31b of main body 31 has a diameter greater than the remainder of the main body and defines a shoulder which acts as an outer stop for longitudinal movement of sleeve member 50 along the bar member 31. Sleeve member 50 is tubular and has an outer diameter sized to fit into the bore of chuck 60 and onto which the jaws 61 of chuck 60 may be tightened to fix the chuck on the sleeve member 50 against axial movement therealong. The inner diameter of sleeve member 50 is sized to permit the sleeve member to slide along the bar member 30 and to rotate about the longitudinal axis thereof. A collar 51 is fixed to the outer end of sleeve member 50 and serves as a means for restraining axial outward movement of chuck 60 when it is fixed on the sleeve member 50. An annular ring 62 is suitably fixed to an intermediate portion of bar member 30 and serves as the inner stop for the longitudinal movement of sleeve member 50 along bar member 30. The ring 62 is positioned so that the jaws of chuck 60 extend to the collar 51 when chuck 60 is on the spindle 40 and the chuck support 10 is positioned on the ways 14 for dismounting the chuck.

A sub-base in the form of a rectangular shaped block 64 is fixed to the underside of base member 12 along the transverse axis thereof and serves as a guide for the chuck support 10 when placing it on the ways 14. Block 64 also serves as a balancing means for the chuck support 10 and a chuck mounted thereon in that the block prevents the entire assembly from shifting laterally of the ways 14 to the extent where the weight of the chuck 60 will cause the chuck support 10 to fall off of or inbetween the ways.

The length of the bar member 30 should be such that the inner section 31a thereof extends into the opening of spindle 40 when the chuck support 10 is positioned on ways 14 for mounting or dismounting the chuck 60 onto or from spindle 40. By so selecting the length of bar member 30, proper alignment of chuck 60 with spindle 40 is enhanced, and, if the chuck support 10 is drawn away from the headstock 66 of the lathe for purposes of refining the alignment of the chuck 60 with spindle 40, for example, the danger of chuck 60 falling off the inner end of bar member 30 is non-existent.

When mounting chuck 60 onto spindle 40, the chuck support 10 is slid along ways 14 with the inner section 31a of the bar member 30 entering into the opening of spindle 40. When the threads in the bore of the chuck 60 and the threads on spindle 40 are properly aligned, the chuck 60 is turned by hand to thereby rotate it with sleeve member 50 about bar member 30, until the chuck 60 is completely threaded on the spindle 40. The jaws of chuck 60 are loosened and the the chuck support withdrawn by sliding it on the ways 14 away from the headstock 66. For dismounting the chuck 60, the reverse procedure is followed.

Figure 3:
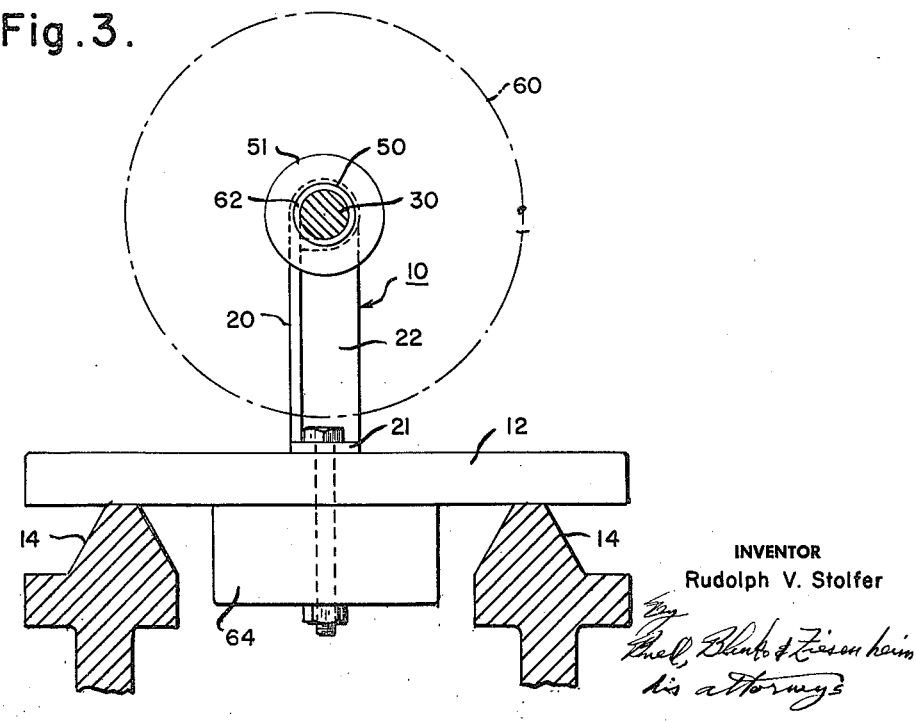
FIGURE 3 is a view looking along the line III—III of FIGURE 1.
Figure 2:
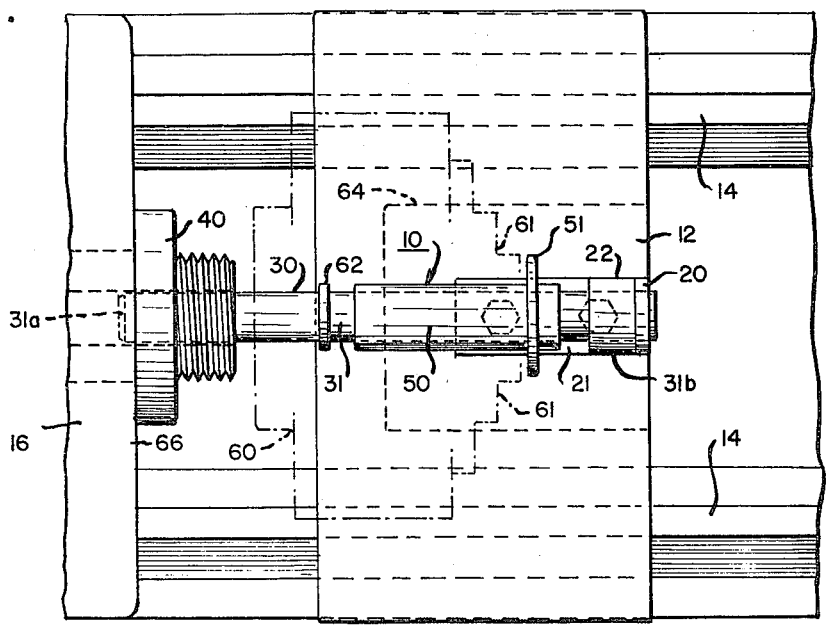
FIGURE 2 is a top plan view of the lathe chuck support of FIGURE 1.
Figure 4:
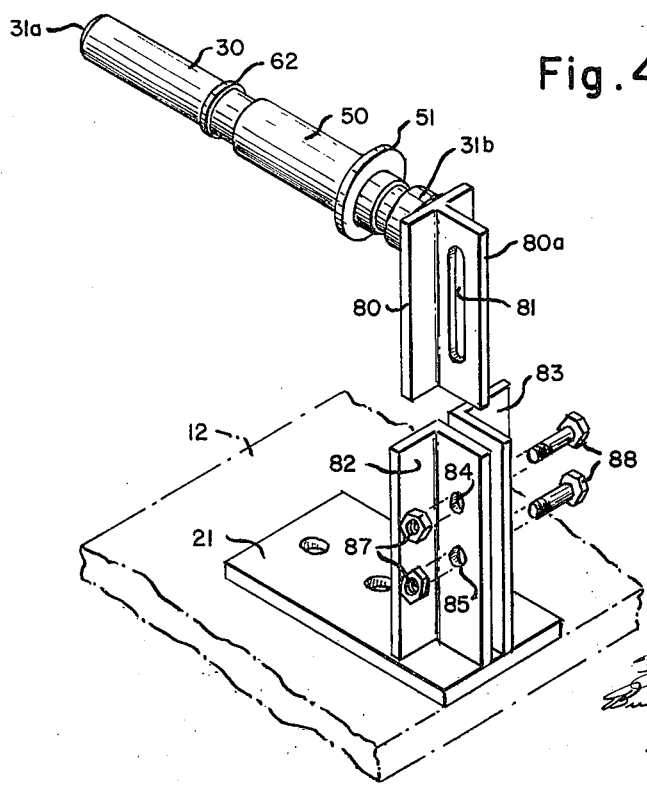
FIGURE 4 is a perspective view of my lathe chuck support showing another embodiment thereof.

FIGURE 4 shows another embodiment of the lathe chuck support of my present invention. The embodiment of FIGURE 4 permits the vertical adjustment of the upright support member and thereby permit use of my lathe chuck support with lathes of different swing sizes. The embodiment of FIGURE 4 includes a base member 12, block 64, bar member 30, sleeve member 50, shoulder 62, base plate 21, and enlarged outer section 31b, all of which are common to the embodiment of FIGURES 1–3. The bar member 30 is, however, suitably fixed to a T section 80 having a slot 81 through an intermediate portion of the leg 80a. T section 80 is snugly, slidably received between spaced L sections 82 and 83 which include coaxial openings 84 and 85 therethrough, only shown in L section 82. The bar member 30 can be positioned in a desired horizontal plane by sliding T section 80 within the spacing between L sections 82 and 83. The T section 80 can then be fixed relative to L sections 82 and 83 by tightening the nuts 87 onto the bolts 88.

While I have shown and described certain present preferred embodiments of the present invention it is to be distinctly understood that the invention is not limited thereto but may be otherwise variously embodied within the scope of the following claims.

I claim:
1. A lathe chuck support comprising:
   an elongated generally flat base member having a longitudinal length sufficient to span the ways of a lathe;
   upright support means fixed on said base member;
   an elongated bar member extending generally transversely of said base member and attached to said support means, said bar member having inner and outer end sections with said inner end section having at least a portion thereof sized to fit into a lathe spindle opening;
   a sleeve member slidably mounted on and rotatable about the longitudinal axis of said bar member, said sleeve member being axially and radially sized to fit in a chuck bore;
   inner and outer stop means fixed on said bar member for defining the longitudinal movement of said sleeve member with respect to said bar member; and
   said bar member being of a length such that said inner end section thereof fits at least partially into a lathe spindle opening when the chuck from such lathe is fixed onto said sleeve member with the sleeve member positioned at said inner stop means.

2. A lathe chuck support as set forth in claim 1 wherein said support means includes a first upright member fixed on said base member; a second upright member slidably mounted on said first upright member for up and down movement with respect thereto; locking means for locking said first and second upright members in a selective position with respect to each other; and wherein said bar member is fixed to said second upright member.

3. A lathe chuck support as set forth in claim 1 including balancing and guide block means fixed to an underside portion of said base member for guiding and balancing said base member between the ways of a lathe.

References Cited

UNITED STATES PATENTS 2,584,169  2/1952  Terry ---------------- 82—34

FOREIGN PATENTS 1,091,670  11/1954  France.

LEONIDAS VLACHOS, Primary Examiner